United States Patent [19]

Marler

[11] Patent Number: 5,182,242
[45] Date of Patent: Jan. 26, 1993

[54] CATALYSTS BOUND WITH LOW ACIDITY REFRACTORY OXIDE

[75] Inventor: David O. Marler, Deptford, N.J.

[73] Assignee: Mobil Oil Corp., Fairfax, Va.

[21] Appl. No.: 896,034

[22] Filed: Jun. 2, 1992

[51] Int. Cl.$^5$ .................. B01J 29/00; B01J 37/00
[52] U.S. Cl. ........................ 502/66; 502/60; 502/64
[58] Field of Search .................. 502/60, 64, 66

[56] References Cited

U.S. PATENT DOCUMENTS

| | | | |
|---|---|---|---|
| 3,702,886 | 11/1972 | Argauer et al. | 423/328 |
| 3,843,741 | 10/1974 | Yan | 260/673.5 |
| 4,013,732 | 3/1977 | Chang et al. | 260/668 R |
| 4,582,815 | 4/1986 | Bowes | 502/64 |
| 5,053,374 | 10/1991 | Absil et al. | 502/64 |
| 5,116,792 | 5/1992 | Ward | 502/66 |

FOREIGN PATENT DOCUMENTS

| | | | |
|---|---|---|---|
| 82-116 | 5/1982 | Japan | 502/64 |
| 112051 | 7/1983 | Japan | 502/64 |

*Primary Examiner*—Carl F. Dees
*Attorney, Agent, or Firm*—Alexander J. McKillop; Dennis P. Santini

[57] ABSTRACT

Low acidity refractory oxide-bound molecular sieve, e.g., zeolite, compositions, for example, zirconia-bound zeolite Beta, possessing superior physical properties, e.g., crush strength, and the method for their manufacture are described. Since low acidity refractory oxide-bound catalysts are less active than alumina-bound zeolite catalysts, the former are particularly useful in hydrocarbon conversion processes in which reduced coke make increases catalyst cycle length. Due to their stability in acid environments, the low acidity refractory oxide-bound molecular sieve extrudate herein can be acid treated without unduly compromising its structural integrity.

22 Claims, No Drawings

CATALYSTS BOUND WITH LOW ACIDITY REFRACTORY OXIDE

BACKGROUND

The invention relates to a method for preparing mechanically stable molecular sieve catalyst compositions possessing a refractory oxide binder of low acidity, e.g., a titania, zirconia and/or silica binder.

The catalysts of the invention possess significant physical strength and will resist abrasion and fracture during loading and transit. These catalysts easily withstand loads in a catalyst bed due to fluid pressure drop and weight of superimposed catalyst. They also have superior interior cohesion allowing for calcination and regeneration without catalyst particle breakup.

Molecular sieves for use as catalyst components herein include zeolites, aluminophosphates, silicoaluminophosphates, layered and pillared-layered materials and other catalytically active crystalline materials.

The term "zeolite" as used herein designates the class of porous crystalline silicates, which contain silicon and oxygen atoms as major components. Other framework components can be present in usually less than about 14 mole %, and often less than about 4%. These components include aluminum, gallium, iron, boron, etc., and combinations thereof. The crystalline aluminosilicates constitute an especially well known type of zeolite.

It is well known that extrusion is one way of obtaining a molecular sieve-containing material which has a high degree of strength for various applications, both catalytic and noncatalytic. Some molecular sieves, e.g., aluminosilicate zeolites, have long been used as catalysts for a wide variety of organic conversion processes. In general, the molecular sieve is incorporated with a matrix, or binder, material in order to impart mechanical stability hereto. The most commonly used matrix materials have included alumina and/or clays since these materials are fairly easy to extrude and provide extrudates of good physical strength for many applications.

It has come to be recognized that low acidity refractory oxides, such as titania, zirconia and silica, are desirable matrix materials and that they possess advantages over alumina for some catalytic reactions. In this connection, U.S. Pat. No. 4,013,732 specifically discloses ZSM-5 with a silica matrix and U.S. Pat. Nos. 3,843,741 and 3,702,886 broadly disclose the use of ZSM-5 with a silica matrix.

U.S. Pat. No. 4,582,815 describes a method for preparing silica-rich solids said to possess improved crush strength compared to that of known silica-bound materials. The method comprises mixing silica-rich solids, preferably a mixture of silica with a zeolite such as ZSM-4 (Omega), ZSM-5, ZSM-11, ZSM-12, ZSM-23, ZSM-35, ZSM-48, Beta, X, Y, L, ferrierite, mordenite, dachiardite, clinoptilolite, offretite, erionite, gmelinite, chabazite, etc., with water and an alkali metal base such as sodium hydroxide or a basic salt such as an alkali-metal carbonate, borate, phosphate, silicate, etc., as an extrusion aid followed by mulling, extruding and subsequently drying the extrudate. It is thought that substitution of alkali metal for hydrogen in the silanol groups on the surfaces of siliceous materials such as the foregoing zeolites is responsible for their improved crush strength. The resulting extrudate is said to possess superior crush strength and sufficient integrity to withstand treatments with acids so that is is possible to steam, acid extract or calcine them. To avoid trapping the alkali metal of the extrusion aid in the extrudate, the alkali metal is ordinarily removed by exchange under acidic conditions using dilute nitric acid in IM ammonium nitrate solution.

Silica-bound zeolite catalysts prepared in accordance with the method described in U.S. Pat. No. 4,582,815 are indicated to be useful in hydrocarbon conversions such as hydrocracking, isomerization, hydrogenation, dehydrogenation, polymerization, reforming, catalytic cracking and catalytic hydrocracking.

U.S. Pat. No. 5,053,374 teaches another method for preparing zeolite catalysts bound with low acidity refractory oxide, e.g. silica. The method involves providing a substantially homogeneous mixture of zeolite, water and low acidity binder at least partly in colloidal form. The mixture is free of added alkali metal base and/or basic salt. The mixture is extruded, dried and calcined to provide the catalyst.

SUMMARY OF THE INVENTION

It has now been discovered that a low acidity refractory oxide-bound molecular sieve possessing superior mechanical stability and low binder acidity making it especially useful as a catalyst for certain kinds of organic compound conversions can be prepared by the method which comprises:

(a) providing a substantially homogenous mixture of molecular sieve material, dispersant, a low acidity refractory oxide ("MO$_x$") binder material and a hydroxy- and/or alkoxy-bridged metallopolymer to provide a formable, e.g., extrudable, mass;

(b) forming, e.g., extruding, the formable, e.g, extrudable, mass resulting from step (a); and (c) calcining the formed product, e.g., extrudate, resulting from step (b).

The formable mass of step (a) is substantially free of added alkali metal base and/or basic salt, added nitric and/or other mineral acid, and does not require that the refractory oxide binder material be present in colloidal form.

Prior to the calcination step (c), the product of step (b) may be dried at a temperature of, e.g., at least 65° C., e.g., from 65° C. to about 260° C., for a time sufficient to dry the step (b) product, e.g., from about 5 minutes, such as when a belt dryer is used, to at least about 1 hour. Calcining step (c) may take place in air, or inert gas, at temperatures ranging, e.g., from about 260° C. to about 815° C. for periods of time ranging, e.g., from about 1 to about 48 hours or more.

The calcined product, e.g., extrudate, can be subjected to other operations such as base exchange, dealumination, steaming, impregnating with catalytically active metal(s), the details of which are well known in the art.

EMBODIMENTS

Although the forming step (b) may involve tableting or pelleting, extrusion is preferred. The extrusion process used herein preferably involves the use of a screw extruder. Such screw extruders are also known as auger extruders or auger-type extruders. Screw extruders are distinguishable from extrusion presses, which are also useful for the present method. In an extrusion press or ram extruder, a mass of extrudable material is forced through a die by means of a plunger or piston which may be mechanically or hydraulically operated.

By virtue of the design of an extrusion press, very large compaction forces may be generated therein. Therefore, it is possible to form an extrudate from masses which would not be extrudable under lower compacting forces by using the large compaction forces of an extrusion press. However, another inherent feature of an extrusion press results in the disadvantage that extrusions cannot be conducted in a continuous fashion. Extrudable masses can only be passed through the die one batch at a time, the piston or plunger being withdrawn from the die between batches.

Unlike extrusion presses, the preferred screw extruders can be operated in a continuous fashion. In a screw extruder, a feed is transported from a feed point to the die by means of a turning screw or auger. The feed is either introduced as an extrudable mass or is converted into an extrudable mass within the extruder with the aid of mixing action imparted by the screw. An example of a screw extruder is a 2" (5 cm) Bonnot extruder. Unlike extrusion in extrusion presses, however, high pressures cannot be generated in screw extruders. Therefore, although extrudate may be formed at a faster rate in screw extruders, by virtue of continuous operation, such screw extruders are more limited than extrusion presses insofar as feeds which may be employed therein. More particularly, masses which are only extrudable under high compaction forces are not extrudable in screw extruders. A surprising feature of the present process was the discovery of a means for forming extrudates with low acidity refractory oxide binders, such as titania, zirconia and/or silica, especially without using high compaction forces beyond the limits achievable by screw extruders.

Unlike alumina binders, low acidity refractory oxide binders such as titania, zirconia and/or silica do not interact with molecular sieves such as, for example, zeolites, to increase the acid catalytic activity thereof. Consequently, molecular sieves can be bound with low acidity refractory oxides in accordance with the method of this invention without increasing the molecular sieves' intrinsic activity as might occur with an alumina binder. To the contrary, the intrinsic catalytic activity of the molecular sieve may actually be decreased by binding it with low acidity refractory oxides, such as titania, zirconia and/or silica. More particularly, molecular sieve activity may be reduced by binding molecular sieves such as ZSM-5, Y, Beta, etc., with these low acidity refractory oxides. It is believed that this reduction in activity may be a result of chemical reactions of the binder with the molecular sieve, whereby high acidity oxides such as alumina in the molecular sieve framework become replaced by low acidity refractory oxides from the binder. For example, zeolites with a silica to alumina molar ratio of 70 or less e.g., 40 or less, may become enriched with, for example, framework silicon content by binding the zeolite with silica and treating the mixture at elevated temperatures. Zeolites treated in this manner may exhibit lower exchange capacities, hexane cracking (e.g., as measured by Alpha Value) and toluene disproportionation activities, and shifts in x-ray diffraction patterns.

In some types of hydrocarbon conversions, e.g., hydroprocessing, reforming, catalytic cracking and hydrocracking, and conversion of olefins to alcohols and/or ethers, the use of low-acidity refractory oxide-bound molecular sieves, such as, for example, zeolites, having lower levels of inherent activity than their alumina-bound counterparts can result in lower coke production and significant increases in cycle length.

Since the low acidity refractory oxide-bound molecular sieve catalysts of the present invention are capable of maintaining their structural integrity in low pH solutions very well, the molecular sieve dispersed in such a binder can be treated with an acid solution to effect dealumination. This effectively results in a reduction in manufacturing costs of low acidity catalysts since extrudates are easier to handle than powders.

The present method requires the presence of a hydroxy-and/or alkoxy-bridged metallopolymer in the extrudable mass of step (a). The product catalyst of this method has superior properties to products of similar catalyst preparation methods, such as compared to products from methods involving colloidal metal oxides and/or added alkali metal base or basic salt. Non-limiting examples of such metallopolymers include Ammonium Zirconium Carbonate (AZC), Zirconium Acetate (ZA), Zirconium Hydroxychloride (ZH), Zirconium Propionate (ZP), Titanium Methoxide (TM), Titanium Ethoxide (TE), and mixtures thereof.

These examples of metallopolymers are items of commerce. The zirconium compounds can be purchased in bulk quantities from Magnesium Elektron Ltd, and the titanium compounds can be obtained from several vendors such as American Tokyo Kasei Inc., Fluka Chemie AG, and Strem Chemicals. Typically, these classes of compounds are manufactured by the reaction of metal halides or metal oxo halides, such as $TiCl_4$, $ZrCl_4$ and $ZrOCl_2$ with water or alcohols, yielding the corresponding hydroxy- and alkoxy-species. In many instances the exact structure of these materials may not be known; however, the presence of —OH and —OR groups can be established by spectroscopic techniques such as infrared analysis.

The method for preparing a low acidity refractory oxide-bound molecular sieve of this invention is not limited to any particular molecular sieve material and in general includes all metallosilicates, metallophosphates, silicoaluminophosphates, and layered and pillared layered materials, particularly the aluminosilicates whether or not previously dealuminized to increase the framework silica:alumina ratio. Typical zeolites include ZSM-4 (Omega), ZSM-5, ZSM-11, ZSM-12, ZSM-20, ZSM-22, ZSM-23, ZSM-35, ZSM-48, ZSM-50, MCM-22, PSH-3, Beta, X, Y and L as well as ferrierite, mordenite, dachiardite, clinoptilolite, offretite, erionite, gmelinite, chabazite, etc. Other molecular sieves contemplated include, for example, MCM-9, VPI-5, MCM-20, SAPO-11, SAPO-17, SAPO-34, SAPO-37, and MCM-41.

It is to be understood that the identification of the molecular sieves, e.g., zeolites, be resolved on the basis of their respective X-ray diffraction patterns. The present invention contemplates utilization of such molecular sieves wherein the mole ratio of silica-to-metal oxide is essentially unbounded. The molecular sieves are not limited to specific silica:metal oxide mole ratios, since they may be substantially metal-free and, yet, having the same crystal structure as the disclosed materials, may be useful or even preferred in some applications. It is the crystal structure, as identified by the X-ray diffraction "fingerprint", which established the identity of the specific molecular sieve, e.g., zeolite, material.

The binder material herein can be selected from among any of the low acidity refractory oxides of metals of Groups IVA and IVB of the Periodic Table of the Elements. Particularly useful are the oxides of silicon, germanium, titanium and zirconium. Combinations of such oxides with each other and with other oxides are also useful provided that at least about 40 weight percent, and preferably at least 50 weight percent, of the total oxide is one or a combination of the aforesaid Group IVA and/or Group IVB metal oxides. Thus, mixtures of oxides which can be used to provide the binder material herein include silica-alumina, silica-magnesia, silica-zirconia, silica-thoria, silica-beryllia, silica-titania, titania-zirconia, silica-alumina-thoria, silica-alumina-zirconia, silica-alumina-magnesia and silica-magnesia-zirconia.

It is an essential requirement of the present method that the formable, e.g., extrudable, mass prepared in step (a) contain, on a $MO_x$ solids basis, at least about 0.5 wt. %, usually from about 1 to about 20 wt. %, preferably from about 2 to about 15 wt. % of the hydroxy-bridged metallopolymer or alkoxy-bridged metallopolymer or mixture thereof.

Water, alcohol, diol or mixtures thereof may be used as a solvent/dispersant. At least part of the low acidity refractory oxide may be added in dry particulate form, e.g. amorphous precipitated silica, so as to control the moisture content of the binder/zeolite/dispersant mixture at a level to ensure satisfactory forming, e.g., extrusion. Preferably the moisture content of the mixture does not exceed 60 wt. %, and preferably is at least 35 wt. %. No alkali metal base or basic salt is added to the mixture.

The composition of the formable mass of step (a) will be as follows, in weight %:

| Component | Useful | Usually | Preferably |
|---|---|---|---|
| Molecular Sieve | 10 to 90 | 25 to 85 | 40 to 80 |
| Metallopolymer* | at least 0.5 | 1 to 20 | 2 to 15 |
| Oxide Binder | 5 to 90 | 10 to 75 | 20 to 60 |

*on a $MO_x$ solids basis

The mixture of molecular sieve, e.g., zeolite, metallopolymer, solvent, e.g., water, and binder, which is to be pelleted, tableted, or extruded, may be obtained by mixing these components in the absence of added water-immiscible solvent. In this regard, U.S. Pat. No. 4,507,396, the entire disclosure of which is expressly incorporated herein by reference, discloses the mixing of various components with water-immiscible solvent to form a hydrous plastic agglomerate, followed by separating the water-immiscible solvent from the hydrous plastic agglomerate, which is, in turn, shaped and dried. The present process may take place without the use of such water-immiscible solvent as called for by U.S. Pat. No. 4,507,396.

The relative proportions of molecular sieve and low acidity refractory oxide binder on an anhydrous basis in the final catalyst can vary widely with the molecular sieve content ranging from between about 1 to about 99 weight percent, e.g., in the range of from about 5 to about 80 weight percent, of the dry composite.

Extrudates of 1/16 inch obtained in accordance with the prior art, as hereinafter exemplified, will typically have a crush strength of from 5 to 25 lb/linear inch when the binder is zirconia, from 5 to 25 lb/inch when the binder is titania, and from 5 to 100 lb/inch when the binder is silica. Extrudates of the present invention, however, have a crush strength of from 25 to 200 lb/linear inch when the binder is zirconia, from 25 to 200 lb/inch when the binder is titania, and from 25 to 200 lb/inch when the binder is silica. In addition, the low acidity refractory oxide-bound extrudates of this invention (not 100% molecular sieve) are also characterized by a high porosity, i.e, from about 0.3 to about 0.7 cc/gram (measured by mercury porosimeter and helium absorption).

The catalyst products of this invention can find utility in a wide variety of processes which are both catalytic and noncatalytic. The materials can be used as absorbents. Additionally, they can be used as catalysts for a variety of organic conversions. As is known in the art, a low acidity refractory oxide such as silica has low catalytic activity such that incorporation of a molecular sieve, e.g., zeolite, with the silica leads to some unusual effects. The low acidity refractory oxide can be used as a support for a catalytic material, e.g., a hydrogenation component such as platinum, palladium, cobalt, molybdenum, iron, tungsten, nickel or mixtures of the same. The catalytic metals in the form of their oxides or salts can also be added to the low acidity refractory oxide during a mulling step with pH adjustment, if necessary, to stabilize the oxide component of the mixture. In addition, the low acidity refractory oxide-bound products find utility in hydrocracking, isomerization, hydrogenation, dehydrogenation, polymerization, reforming, catalytic cracking, catalytic hydrocracking, toluene disproportionation, and the like. Thus, extrudates of this invention can be used with or without added active metal components for catalytic cracking, isomerization, alkylation, reforming and hydrogenative conversions such as hydrocracking, hydrogenation and hydrofining, e.g., desulfurization and denitrogenation. Catalytic cracking conditions usually include temperatures of at least 315° C., generally from about 400° C. to about 600° C., and pressures between atmospheric and about 200 psig. Hydrogenative conversions can be accomplished at various conditions depending on the feedstock characteristics and the desired degree of conversion. Hydrogenation can be effected at pressures of from about 300 psig to about 3000 psig and at temperatures of from about 90° C. to about 540° C., usually from about 315° C. to about 485° C. Hydrogen is added at rates of at least about 500 standard cubic feet per barrel, usually from about 1000 to about 20,000 SCF/BBL.

Catalyst products of this invention comprising titania, zirconia or a mixture thereof as binder are especially useful for conversion of olefins to alcohols and/or ethers. The alcohols and/or ethers resulting from this conversion process may be advantageously employed, for example, as blending components for gasoline, and as cosolvents for methanol to be incorporated into gasoline.

More particularly, with regard to the latter identified catalytic use of the present catalysts, the conversion of individual light olefins and mixtures of olefins of various structures, preferably within the $C_{2-7}$ range is accomplished. Accordingly, the process involves conversion of ethylene, propylene, butenes, pentenes, hexenes, heptenes, mixtures of these and other olefins such as gas plant off-gas containing ethylene and propylene, naphtha cracker off-gas containing light olefins, fluidized catalytic cracked (FCC) light gasoline containing pentenes, hexenes and heptenes, refinery FCC propane-/propylene streams, etc. This process of the invention is especially applicable to the conversion of propylene and propylene-containing streams to mixtures of IPA and DIPE.

When olefin is reacted with water to provide an alcohol, the reaction can be regarded as one of hydration, although some product alcohol can, and does, react with olefin feed to co-produce ether. When olefin is reacted solely with alcohol to provide an ether, the reaction can be regarded as one of etherification. When olefin is reacted with both water and alcohol to provide a mixture of alcohol and ether, the resulting conversion involves both hydration and etherification reactions. In addition, other reactions such as the chemical dehydration of alcohol to ether may occur to some extent.

Lower alcohols which are suitable for reaction with light olefin over the present catalyst, optionally together with water, include alcohols having from 1 to 6 carbon atoms, i.e., methanol, ethanol, propanol, isopropyl alcohol, n-butanol, tert-butanol, the pentanols and the hexanols.

The operating conditions of the olefin conversion process over the present catalyst include a temperature ranging from ambient to about 300° C., preferably from about 50° to about 220° C., and more preferably from about 100 to about 200° C.; a total system pressure of at least about 3 atm, preferably at least about 20 atm, and more preferably at least about 40 atm; a total water and/or alcohol to olefin mole ratio of from about 0.1 to about 30, preferably from about 0.2 to about 15, and more preferably from about 0.3 to about 5. When the conversion is primarily one of hydration, it may be preferable to operate at low water to total olefin mole ratios of less than about 1. Those skilled in the art will recognize that selection of specific operating conditions for a particular feed will influence product distribution.

It will also be appreciated that the precise conditions selected for the olefin conversion process should reflect the nature of the olefin feed. For example, isoolefins generally require milder process conditions than straight chain olefins. Thus, in the case of isobutylene, $CH_2=CH(CH_3)_2$, good conversions to ether can be obtained with process conditions of from about 30° C. to about 100° C., a pressure which is at least sufficient to maintain the isobutylene in the liquid phase, e.g., about 3 atm or higher, a water and/or alcohol to isobutylene mole ratio of from about 0.1 to about 30, preferably from 0.2 to about 15 and more preferably from about 0.3 to about 5 and an LHSV of from about 0.1 to about 25 $hr^{-1}$.

The olefin conversion process over the catalyst of this invention can be carried out under liquid phase, vapor phase or mixed vapor-liquid phase conditions in batch or in a continuous manner using a stirred tank reactor or fixed bed flow reactor, e.g., of the trickle-bed, liquid-up-flow, liquid-down-flow, counter-current, etc., type. Reaction times of from about 20 minutes to about 20 hours when operating in batch and an LHSV of from about 0.1 to about $25^{-1}$ hr when operating continuously are generally suitable. It may be advantageous to recover any unreacted olefin and recycle it to the reactor.

When seeking to maximize the production of ether by the hydration of olefin, the aqueous product effluent from the olefin hydration reactor containing alcohol and ether can be introduced into a separator, e.g., a distillation column, for recovery of ether. The dilute aqueous solution of alcohol may be then introduced into a second separator, e.g., another distillation column, where a water/alcohol azeotrope is recovered. A fraction of the azeotrope may be fed into a dehydration reactor of conventional or otherwise known type and operation to provide a further quantity of ether which can be combined with the ether previously recovered from the olefin hydration reactor. By blending various product streams, almost any ratio of alcohol/ether can be obtained. When alcohol and ether mixtures are to be used as gasoline blending stocks, this capability for adjusting the ratios of alcohol to ether offers great flexibility in meeting the octane requirements for given gasoline compositions. Regulatory considerations aside, alcohol and ether mixtures, e.g., IPA and DIPE mixtures, can constitute up to about 20 weight percent or so of the gasoline to which they are added.

A procedure for producing mixtures of alcohol and ether, and in particular IPA and DIPE, from the hydration of an olefin-containing feed (a propylene-containing feed in the case of IPA and DIPE mixtures) employing a catalyst of the present invention comprising a large-pore zeolite such as zeolite Y or zeolite Beta is particularly advantageous. In this procedure a fresh propane/propylene-containing feed (readily available in many petroleum refineries) and fresh water are cofed, together with recycled unreacted propylene and recycled water from a decanter, into a hydration reactor. The reactor effluent is passed to a separator unit with propane and unconverted propylene being recycled to the reactor, part of the gaseous mixture being purged in order to avoid build-up of propane in the recycle loop. The liquid products from the separator unit are introduced into a distillation unit where an azeotropic mixture of IPA, DIPE, water and propylene oligomers (mostly $C_6$ olefin) is distilled off and, following cooling, is introduced into a decanter in which phase separation takes place. The upper layer contains mostly DIPE, e.g., 90 weight percent or more, and relatively little water, e.g., 1 weight percent or so. The lower layer is largely water containing negligible quantities of IPA and DIPE. The quantity of the decanter overheads which is recycled can be regulated so as to control the water content in the final product. The bottom fraction of the distillation unit, mainly IPA, is combined with DIPE in the decanter overheads to provide the final IPA/DIPE mixture.

Where it is desired to separate out the alcohol from an alcohol/ether mixture and thus provide essentially pure ether, one can advantageously practice the procedure referred to above. According to this process as applied to the production of DIPE, the propylene component of a mixed propane/propylene feed undergoes hydration over catalyst of the present invention comprising a large-pore, i.e., greater than about 6 Angstrom units in cross-section, zeolite olefin hydration catalyst, e.g., zeolite Y or zeolite Beta, in a hydration reactor with the effluent therefrom being passed to a separator operating below the olefin hydration reaction temperature. There, two liquid phases form, the aqueous phase being removed and recycled to the hydration reactor. The hydrocarbon-rich phase is flashed to a lower pressure to effect separation of the unreacted $C_3$ components. The flashed product, now containing a substantial amount of IPA product, is introduced to a distillation unit operated at or below atmospheric pressure to effect further purification of the DIPE. The azeotropic IPA, DIPE and water overhead product containing a small amount of propylene oligomer is condensed and thereafter contacted with reactor feed water. The resulting phase separation provides a DIPE product containing at most negligible amounts of IPA and water, e.g., about 1.0 weight percent and 0.5 weight percent of these materials, respectively. The remaining aqueous phase can be recycled to the reactor.

Representative of the zeolites which are useful as components of the present catalyst are zeolite Beta, zeolite X, zeolite L, zeolite Y, ultrastable zeolite Y (USY), dealuminized Y (Deal Y), mordenite, ZSM-3, ZSM-5, ZSM-11, ZSM-12, ZSM-20, ZSM-22, ZSM-23, ZSM-35, ZSM-50, compositions of U.S. Pat. No. 4,962,239, e.g., MCM-22 and PSH-3, and mixtures of any of the foregoing. As used herein, large-pore size refers to pores having an average cross-section of greater than about 6 Angstroms, and medium-pore size refers to pores having an average cross-section of from about 4 to about 6 Angstroms.

Also included within the definition of the useful molecular sieves are crystalline porous silicoaluminophosphates such as those disclosed in U.S. Pat. No. 4,440,871, the catalytic behavior of which is similar to that of the aluminosilicate zeolites.

Zeolite Beta is described in U.S. Re. Pat. No. 28,341 (of original U.S. Pat. No. 3,308,069), to which reference is made for details of this catalyst.

Zeolite X is described in U.S. Pat. No. 2,882,244, to which reference is made for the details of this catalyst.

Zeolite L is described in U.S. Pat. No. 3,216,789, to which reference is made for the details of this catalyst.

Zeolite Y is described in U.S. Pat. No. 3,130,077, to which reference is made for details of this catalyst.

Low sodium ultrastable zeolite Y (USY) is described in U.S. Pat. Nos. 3,293,192, 3,354,077, 3,375,065, 3,402,996, 3,449,070 and 3,595,611, to which reference is made for details of this catalyst.

Dealuminized zeolite Y can be prepared by the method disclosed in U.S. Pat. No. 3,442,795, to which reference is made for details of this catalyst.

Zeolite ZSM-3 is described in U.S. Pat. No. 3,415,736, to which reference is made for details of this catalyst.

Zeolite ZSM-5 is described in U.S. Pat. No. Re. 29,948 (of original U.S. Pat. No. 3,702,886), to which reference is made for details of this catalyst.

Zeolite ZSM-11 is described in U.S. Pat. No. 3,709,979, to which reference is made for the details of this catalyst.

Zeolite ZSM-12 is described in U.S. Pat. No. 3,832,449, to which reference is made for the details of this catalyst.

Zeolite ZSM-20 is described in U.S. Pat. No. 3,972,983, to which reference is made for the details of this catalyst.

Zeolite ZSM-22 is described in U.S. Pat. No. 4,556,477, to which reference is made for the details of this catalyst.

Zeolite ZSM-23 is described in U.S. Pat. No. 4,076,842, to which reference is made for the details of this catalyst.

Zeolite ZSM-35 is described in U.S. Pat. No. 4,016,245, to which reference is made for the details of this catalyst.

Zeolite ZSM-50 is described in U.S. Pat. No. 4,640,829, to which reference is made for details of this catalyst.

U.S. Pat. No. 4,962,239 to which reference is made above is incorporated herein by reference in its entirety. This patent teaches a process for preparing ethers over catalyst comprising a particular class of zeolites, e.g., MCM-22 and PSH-3.

MCM-41 is described in U.S. Pat. No. 5,098,684, to which reference is made for the details of this catalyst.

The original cations associated with each of the molecular sieves utilized herein can be replaced by a wide variety of other cations employing techniques well known in the art. Typical replacing cations including hydrogen and hydrogen precursors, e.g., ammonium and alkyl ammonium, and metal cations. Suitable metal cations include metals such as rare earth metals, as well as metals of Groups IIA, IIIA, IVA, IB, IIB, IIIB, IVB, VIB and VIII of the Periodic Table, e.g., platinum and palladium.

Typical ion-exchange techniques call for contacting the selected molecular sieve, e.g., zeolite, with a salt of the desired replacing cation. Although a wide variety of salts can be employed, particular preference is given to chloride, nitrates and sulfates. Representative ion-exchange techniques are disclosed in a wide variety of patents including U.S. Pat. Nos. 3,140,249; 3,140,251; and 3,140,253.

Following contact with a solution of the desired replacing cation, the molecular sieve is then preferably washed with water and dried at a temperature ranging from about 65° C. to about 315° C. and thereafter calcined in air, or other inert gas, at temperatures ranging from about 260° C. to about 815° C. for periods of time ranging from about 1 to about 48 hours or more. Catalysts of improved selectivity and other beneficial properties can be obtained by subjecting the molecular sieve to treatment with steam at elevated temperatures ranging from about 260° C. to about 650° C., and preferably from about 400° C. to about 540° C. The treatment can be accomplished in an atmosphere of 100% steam or in an atmosphere consisting of steam or ammonia and some other gas which is essentially inert to the molecular sieves. A similar treatment can be accomplished at lower temperatures and elevated pressure, e.g., from about 175° C. to about 375° C. at from about 10 to about 200 atmospheres.

If so desired, the catalyst can be treated with reagents prior to steaming and with organics still contained to remove alumina from the outside surface, or calcined in air or inert atmosphere to remove the organics and then ion exchanged to the ammonium form or other desired metal exchanged form. It is a special attribute herein that it has sufficient integrity to withstand treatment with acids s that it is possible to extrude an aluminosilicate zeolite such as zeolite Y and steam, acid extract, calcine or effect combinations thereof to produce a stable high silica-to-alumina Y in an easily handled form. Processes for dealuminizing Y are well known in the art, i.e., see Rabo, *Zeolite Chemistry and Catalysis*, ACS Monograph 171 (1976), Chapter 4, the entire disclosure being incorporated by reference herein.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec $^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C.

and a variable flow rate as described in detail in the *Journal of Catalysis,* Vol. 61, p. 395.

EXAMPLES

The specific examples herein presented demonstrate the present invention (Examples 7, 8, 9 and 10) and provide comparisons with other catalyst preparation methods involving low acidity refractory oxide binders. Example 1 utilizes a catalyst preparation method demonstrated in U.S. Pat. No. 5,144,084 (Ser. No. 07/798,017, filed Nov. 20, 1991). Examples 2 and 3 are analogous to the catalyst preparation method of U.S. Pat. No. 4,053,374. Examples 4 and 5 utilize caustic as in U.S. Pat. No. 4,582,815. Example 6 prepares a catalyst comprising a low acidity binder by a method involving an acid to facilitate extrusion. Comparison of the examples demonstrates the superior results obtained by the present invention.

EXAMPLE 1

An ammonium-tetraethylammonium form sample of zeolite Beta was combined with $ZrO_2$ to form a mixture of 65 parts, by weight, zeolite and 35 parts zirconia. Water was added to this mixture to allow the resulting catalyst to be formed into extrudate. After drying at 120° C., the catalyst extrudate was thermally treated by calcination at 482° C. in nitrogen for two hours followed by the replacement of the nitrogen with air. The calcination was completed by raising the temperature to 538° C. and maintaining that temperature for six hours.

The crush strength of the resultant extrudate particles was then determined to be <10 lb/inch.

EXAMPLE 2

An ammonium-tetraethylammonium form sample of zeolite Beta was combined with $ZrO_2$ and NYACOL $ZrO_2$ (AC), a 20 wt % colloidal zirconia suspension marketed by PQ Corp., to form a mixture of 65 parts, by weight (100% solids basis), zeolite, 33 parts $ZrO_2$ and 2 parts colloid. Water was added to the mixture to allow the resulting catalyst to be formed into extrudate. After drying at 120° C. the catalyst extrudate was calcined in flowing nitrogen at 538° C. for three hours.

The crush strength of the resultant catalyst was determined to be <10 lb/inch.

EXAMPLE 3

An ammonium-tetraethylammonium form sample of zeolite Beta was combined with $ZrO_2$ and NYACOL $ZrO_2$ (AC), a 20 wt % colloidal zirconia suspension marketed by PQ Corp., to form a mixture of 65 parts, by weight (100% solids basis), zeolite, 26 parts $ZrO_2$ and 9 parts colloid. Water was added to the mixture to allow the resulting catalyst to be formed into extrudate. After drying at 120° C. the catalyst extrudate was calcined in flowing nitrogen at 538° C. for three hours.

The crush strength of the resultant catalyst was determined to be <10 lb/inch.

EXAMPLE 4

An ammonium-tetraethylammonium form sample of zeolite Beta was combined with $ZrO_2$, NYACOL $ZrO_2$, and 50% NaOH, to form a mixture of 68 parts by weight (100% solids basis), zeolite, 27 parts $ZrO_2$, 2 parts colloid, and 3 parts NaOH. Water was added to the mixture to allow the resultant catalyst to be formed into extrudate. Following drying at 120° C., the extrudate particles were thermally treated at 538° C. in flowing nitrogen for three hours.

The crush strength for the final extrudate was determined to be 23 lb/inch.

EXAMPLE 5

An ammonium-tetraethylammonium form sample of zeolite Beta was combined with $ZrO_2$, NYACOL $ZrO_2$, and 50% NaOH, to form a mixture of 62 parts by weight (100% solids basis), zeolite, 30 parts $ZrO_2$, 2 parts colloid, and 6 parts NaOH. Water was added to the mixture to allow the resultant catalyst to be formed into extrudate. Following drying at 120° C., the extrudate particles were thermally treated at 538° C. in flowing nitrogen for three hours.

The crush strength for the final extrudate was determined to be 27 lb/inch.

EXAMPLE 6

An ammonium-tetraethylammonium form sample of zeolite Beta was combined with $ZrO_2$, to form a mixture of 65 parts, by weight, zeolite and 35 parts zirconia. Water and 0.5 parts nitric acid were added to the mixture to allow the resultant catalyst to be formed into extrudate. Following drying at 120° C., the catalyst extrudate was calcined at 538° C. in flowing nitrogen for three hours.

The crush strength of the extrudate particles was found to be <10 lb/inch.

EXAMPLE 7

An ammonium-tetraethylammonium form sample of zeolite Beta was combined with $ZrO_2$ and Ammonium Zirconium Carbonate (AZC), a water soluble, hydroxy-bridged zirconium polymer containing 20% $ZrO_2$ sold by Magnesium Elektron, to form a mixture of 70 parts, by weight, zeolite, 15 parts $ZrO_2$ and 15 parts AZC. Water was added to this mixture to allow the resulting catalyst to be formed into extrudate. The catalyst was heated at 482° C. in nitrogen for two hours followed by the replacement of the nitrogen with air. Calcination was completed by raising the temperature to 538° C. and maintaining that temperature for six hours.

The crush strength of the calcined extrudate particles was determined to be 160 lb/inch.

EXAMPLE 8

An ammonium-tetraethylammonium form sample of zeolite Beta was combined with $ZrO_2$ and Ammonium Zirconium Carbonate (AZC) containing 20% $ZrO_2$ to form a mixture of 70 parts, by weight, zeolite, 20 parts $ZrO_2$ and 10 parts AZC. Water was added to this mixture to allow the resulting catalyst to be formed into extrudate. The catalyst was activated by heating at 482° C. in nitrogen for two hours followed by the replacement of the nitrogen with air. Calcination was completed by raising the temperature to 538° C. and maintaining that temperature for six hours.

The crush strength of the calcined extrudate particles was determined to be 95 lb/inch. The Alpha Value proved to be 430. The pore size distribution for this catalyst is presented in the following table:

| Pore Size Distribution for Example 8 Catalyst | |
|---|---|
| Pore Size Range, Angstroms | CC/Gram |
| 30–50 | 0.024 |
| 50–80 | 0.023 |

-continued

| Pore Size Distribution for Example 8 Catalyst | |
|---|---|
| Pore Size Range, Angstroms | CC/Gram |
| 80-100 | 0.013 |
| 100-150 | 0.031 |
| 150-200 | 0.036 |
| 200-300 | 0.139 |
| 300+ | 0.100 |
| Total | 0.367 |

EXAMPLE 9

An ammonium-tetraethylammonium form sample of zeolite Beta was combined with $ZrO_2$ and Ammonium Zirconium Carbonate (AZC) containing 20% $ZrO_2$ to form a mixture of 70 parts, by weight, zeolite, 25 parts $ZrO_2$ and 5 parts AZC. Water was added to this mixture to allow the resulting catalyst to be formed into extrudate. The catalyst was activated by heating at 482° C. in nitrogen for two hours followed by the replacement of the nitrogen with air. Calcination was completed by raising the temperature to 538° C. and maintaining that temperature for six hours.

The crush strength of the calcined extrudate particles was determined to be 40 lb/inch. The catalyst Alpha Value proved to be 470. The pore size distribution for this catalyst is presented in the following table:

| Pore Size Distribution for Example 8 Catalyst | |
|---|---|
| Pore Size Range, Angstroms | CC/Gram |
| 30-50 | 0.023 |
| 50-80 | 0.023 |
| 80-100 | 0.012 |
| 100-150 | 0.026 |
| 150-200 | 0.028 |
| 200-300 | 0.081 |
| 300+ | 0.250 |
| Total | 0.444 |

EXAMPLE 10

A sodium form sample of ZSM-5 was ammonium exchanged with a 1M solution of ammonium nitrate (5 cc of solution per gram of zeolite) for 2 hours and then washed with water. The resultant crystals were dried at 120° C. overnight. A physical mixture of the $NH_4$-ZSM-5 (65 parts, by weight), 31 parts titania powder (Kemeria Unitane 906, 84% $TiO_2$) and 4 parts ammonium zirconium carbonate (20 wt% $ZrO_2$) was mulled to form a uniform mixture. Sufficient water was added to form an extrudable paste. The mixture was auger extruded to 1/16" cylindrical-shape extrudates and dried in an oven at 120° C. The catalyst particles were then calcined in a nitrogen atmosphere at 480° C. for 3 hours followed by a 6 hour calcination in air at 538° C. The crush strength of the final product was 44 lb/inch and the Alpha Value was 800.

What is claimed is:

1. A method for preparing a low acidity refractory oxide-bound molecular sieve composition which comprises:

a) providing a substantially homogenous mixture of molecular sieve, dispersant, a low acidity refractory oxide binder material and hydroxy-bridged metallopolymer, alkoxy-bridged metallopolymer or mixture thereof to provide a formable mass;

b) forming the formable mass resulting from step (a); and c) calcining the formed product resulting from step (b).

2. The method of claim 1 wherein the low acidity refractory oxide binder material comprises at least 40% of silica, germania, titania, zirconia, or combination thereof.

3. The method of claim 1 wherein the molecular sieve component is a medium-pore zeolite.

4. The method of claim 1 wherein the molecular sieve component is selected from the group consisting of those having the structure of ZSM-5, ZSM-11, ZSM-12, ZSM-22, ZSM-23, ZSM-35, ZSM-50, MCM-22, and PSH-3.

5. The method of claim 1 wherein the molecular sieve component is a large-pore zeolite.

6. The method of claim 1 wherein the molecular sieve component is selected from the group consisting of those having the structure of zeolite Y, zeolite L, zeolite Beta, ZSM-4, ZSM-20, and mordenite.

7. The method of claim 1 wherein the molecular sieve component is selected from the group consisting of those having the structure of VPI-5, SAPO-11, SAPO-17, SAPO-34, and SAPO-37.

8. The method of claim 1 wherein the molecular sieve component has the structure of MCM-41.

9. The method of claim 1 wherein the formed product of step (b) is dried prior to step (c).

10. The method of claim 7 which further comprises ion-exchanging the dried formed product of step (b).

11. The method of claim 1 wherein step (b) is conducted in a screw extruder.

12. The method of claim 1 which further comprises treating the product of step (c) by ion-exchange, steaming, acid treating, or a combination thereof.

13. The low acidity refractory oxide-bound molecular sieve composition resulting from the method of claim 1.

14. A method for preparing a low acidity refractory oxide-bound molecular sieve composition which comprises:

a) continuously providing a substantially homogenous mixture of molecular sieve, dispersant, a low acidity refractory oxide binder material and hydroxy-bridged metallopolymer, alkoxy-bridged metallopolymer or mixture thereof to provide an extrudable mass;

b) continuously extruding the extrudable mass resulting from step (a) using a screw extruder;

c) drying the extrudate resulting from step (b); and d) calcining the dried extrudate resulting from step (c).

15. The method of claim 14 wherein said molecular sieve is selected from the group consisting of those having the structure of ZSM-5, zeolite Y and zeolite Beta.

16. The low acidity refractory oxide-bound molecular sieve composition resulting from the method of claim 14.

17. The low acidity refractory oxide-bound molecular sieve composition resulting from the method of claim 1 which comprises a hydrogenation component.

18. The composition of claim 17 wherein said hydrogenation component is selected from the group consisting of platinum, palladium, cobalt, molybdenum, iron, tungsten, nickel, and mixtures thereof.

19. The low acidity refractory oxide-bound molecular sieve composition resulting from the method of claim 14 which comprises a hydrogenation component.

20. The composition of claim 19 wherein said hydrogenation component is selected from the group consisting of platinum, palladium, cobalt, molybdenum, iron, tungsten, nickel, and mixtures thereof.

21. The method of claim 1 wherein said molecular sieve has original cations replaced, at least in part, with a cation or a mixture of cations selected from the group consisting of hydrogen and hydrogen precursors, rare earth metals, and metals of Groups IIA, IIIA, IVA, IB, IIB, IIIB, IVB, VIB, and VIII of the Periodic Table of the Elements.

22. The method of claim 14 wherein said molecular sieve has original cations replaced, at least in part, with a cation or a mixture of cations selected from the grou consisting of hydrogen and hydrogen precursors, rare earth metals, and metals of Groups IIA, IIIA, IVA, IB, IIB, IIIB, IVB, VIB, and VIII of the Periodic Table of the Elements.

* * * * *